(12) United States Patent
Donderici et al.

(10) Patent No.: US 9,951,605 B2
(45) Date of Patent: Apr. 24, 2018

(54) OPTIMIZED SAGD WELL PLACEMENT UTILIZING TEMPERATURE AND ELECTROMAGNETIC MEASUREMENTS

(71) Applicant: Halliburton Energy Services, Inc., Houston, TX (US)

(72) Inventors: Burkay Donderici, Houston, TX (US); Malcolm Upshall, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 142 days.

(21) Appl. No.: 14/888,212

(22) PCT Filed: Jul. 16, 2014

(86) PCT No.: PCT/US2014/046880
§ 371 (c)(1),
(2) Date: Oct. 30, 2015

(87) PCT Pub. No.: WO2016/010533
PCT Pub. Date: Jan. 21, 2016

(65) Prior Publication Data
US 2016/0168977 A1    Jun. 16, 2016

(51) Int. Cl.
*E21B 43/24* (2006.01)
*E21B 47/022* (2012.01)
(Continued)

(52) U.S. Cl.
CPC .......... *E21B 47/02216* (2013.01); *E21B 7/04* (2013.01); *E21B 7/06* (2013.01);
(Continued)

(58) Field of Classification Search
CPC ...... E21B 7/046; E21B 7/04; E21B 47/02216; E21B 47/065; E21B 47/06; E21B 43/2406; E21B 43/2408; E21B 43/24
See application file for complete search history.

(56) References Cited

U.S. PATENT DOCUMENTS

2007/0278008 A1    12/2007   Kuckes et al.
2009/0296522 A1    12/2009   Tang et al.
(Continued)

FOREIGN PATENT DOCUMENTS

WO    WO 2013/105969 A1    7/2013
WO    WO 2014/089402 A2    6/2014

OTHER PUBLICATIONS

T.Stone et al., Practical Control of SAGD Wells With Dual-Tubing Strings, Jan. 2014, Canadian Petroleum Technology.*
(Continued)

*Primary Examiner* — David J Bagnell
*Assistant Examiner* — Dany E Akakpo
(74) *Attorney, Agent, or Firm* — Haynes & Boone, LLP

(57) ABSTRACT

A system for optimizing placement of a second wellbore relative to a first wellbore utilizing i) steam injected into the first wellbore in combination with a temperature sensor located in the second wellbore and ii) electromagnetic (EM) fields emanating from the first wellbore in combination with an EM sensor in the second wellbore. The magnetic measurements made with the EM sensor are utilized to determine azimuthal placement of a wellbore, while temperature measurements made with the temperature sensor are utilized to determine distance for placement of the wellbore.

26 Claims, 7 Drawing Sheets

(51) Int. Cl.
    *E21B 47/024*     (2006.01)
    *E21B 7/06*     (2006.01)
    *G01V 3/20*     (2006.01)
    *G01V 9/00*     (2006.01)
    *E21B 47/06*     (2012.01)
    *E21B 7/04*     (2006.01)

(52) U.S. Cl.
    CPC ...... *E21B 43/2406* (2013.01); *E21B 43/2408* (2013.01); *E21B 47/022* (2013.01); *E21B 47/024* (2013.01); *E21B 47/065* (2013.01); *G01V 3/20* (2013.01); *G01V 9/005* (2013.01)

(56) References Cited

U.S. PATENT DOCUMENTS

2011/0133741 A1*   6/2011   Clark ................ E21B 47/02216
                                                                                                  324/345
2013/0118809 A1     5/2013   Veeningen

OTHER PUBLICATIONS

Benedikt Steingrimsson, "Geothermal Well Logging: Geological Wireline Logs and Fracture Imaging," Short Course on Geothermal Drilling, Resource Development and Power Plants, United Nations University Geothermal Training Programme, Jan. 16-22, 2011, Santa Tecla, El Salvador.

Koolman, et al., "Electromagnetic Heating Method to Improve Steam Assisted Gravity Drainage," International Thermal Operations and Heavy Oil Symposium, Oct. 20-23, 2008, Calgary, Alberta, Canada.

Moini, et al., Quantifying Heat Requirements for SAGD Startup Phase: Steam Injection, Electrical Heating, Journal of Canadian Petroleum Technology, Mar. 2013, vol. 52, Issue No. 2, Society of Petroleum Engineers.

International Search Report and The Written Opinion of the International Searching Authority, or the Declaration, dated Apr. 13, 2015, PCT/US2014/046880, 17 pages, ISA/KR.

* cited by examiner

OPTIMIZED SAGD WELL PLACEMENT UTILIZING TEMPERATURE AND ELECTROMAGNETIC MEASUREMENTS

The present application is a U.S. National Stage patent application of International Patent Application No. PCT/US2014/046880, filed on Jul. 16, 2014, the benefit of which is claimed and the disclosure of which is incorporated herein by reference in its entirety.

FIELD OF THE DISCLOSURE

The disclosure relates to wellbore drilling operations, and more particularly to methods and systems for tracking the drilling of multiple wellbores relative to one another. Most particularly, the disclosure relates to methods and systems for determining the relative location of a reference wellbore from a wellbore being drilled using magnetic and thermal measurements.

BACKGROUND OF THE DISCLOSURE

As easy-to-access and easy-to-produce hydrocarbon resources are depleted, there is an increased demand for more advanced recovery procedures. One such procedure is steam assisted gravity drainage (SAGD), a procedure that utilizes steam in conjunction with two spaced apart wellbores. Specifically, SAGD addresses the mobility problem of heavy oil in a formation through the injection of high pressure, high temperature steam into the formation. This high pressure, high temperature steam reduces the viscosity of the heavy oil in order to enhance extraction. The injection of steam into the formation occurs from a first wellbore (injector) that is drilled above and parallel to a second wellbore (producer). As the viscosity of the heavy oil in the formation around the first wellbore is reduced, the heavy oil drains into the lower second wellbore, from which the oil is extracted. Other advanced recovery procedures include thermal Assisted Gravity Drainage (TAGD), Toe to Heal Air Injection (THAI), Vaporized Hydrocarbon Solvent (VAPEX) production and Fire Flooding. In all of these advanced recovery procedures, the precise placement of adjacent local cased wellbores is an important aspect of the process.

More specifically, the two wellbores are typically drilled at a fixed distance of only a few meters from one other. The placement of the injector wellbore needs to be achieved with very small margin in distance. If the injector wellbore is positioned too close to the producer wellbore, the producing wellbore would be exposed to direct communication of steam at very high pressure and temperature. If the injector wellbore is positioned too far from the producer wellbore, the efficiency of the particular advanced recovery process may be reduced. In order to assist in ensuring that the second wellbore is drilled and positioned as desired relative to the first wellbore, a survey of the two wellbores in the formation is often conducted. These surveying techniques are traditionally referred to as "ranging". Based on ranging, the trajectory of the second wellbore, i.e., the wellbore being drilled, can be altered to ensure the fixed distance between the wellbores is maintained.

One common ranging technique employs electromagnetic (EM) systems and methods to determine direction and distance between two wellbores and ensure the fixed distance between the wellbores is maintained. In EM ranging systems, an elongated, conductive pipe string, such as the wellbore casing, is disposed in one of the wellbores. This wellbore is typically referred to as the "target" wellbore and usually represents the producer wellbore. In any event, a current is applied to this conductive pipe string in the target wellbore by a low-frequency current source. The current flow along the conductive pipe string and result in EM fields around the target wellbore. These EM fields around the target wellbore are measured using an electromagnetic field sensor system disposed in the other wellbore, which is typically the wellbore in the process of being drilled. This second wellbore usually represents the producer wellbore. The measured magnetic field can then be utilized to determine distance, direction and angle between two wellbores, and if necessary, alter the trajectory of the wellbore being drilled. Ranging systems in which a current is injected into the target wellbore in order to induce a magnetic field around the target wellbore are referred to as "active" ranging systems.

The existing electromagnetic ranging methods have been used successfully to place an injector wellbore at fixed distance from a producer wellbore in operations such as SAGD. In such operations, it has been observed that if the wellbores are closer than optimal, direct fluid communication in the form of steam may be observed resulting in production of steam as opposed to hydrocarbons. Likewise, if the wellbores are farther than optimal, mobility of hydrocarbons will not be increased high enough for production. In any case, wellbores are typically placed using EM ranging at fixed separation distance from one another, whereby the separation distance is chosen to optimize and balance these two above-mentioned considerations. However, due to variations in the geology and formation characteristics, a constant distance is usually not always optimal for production. Furthermore, the distance may not be selected properly, or may be selected too conservatively which can lead to non-optimal production.

DETAILED DESCRIPTION

Figure 1:
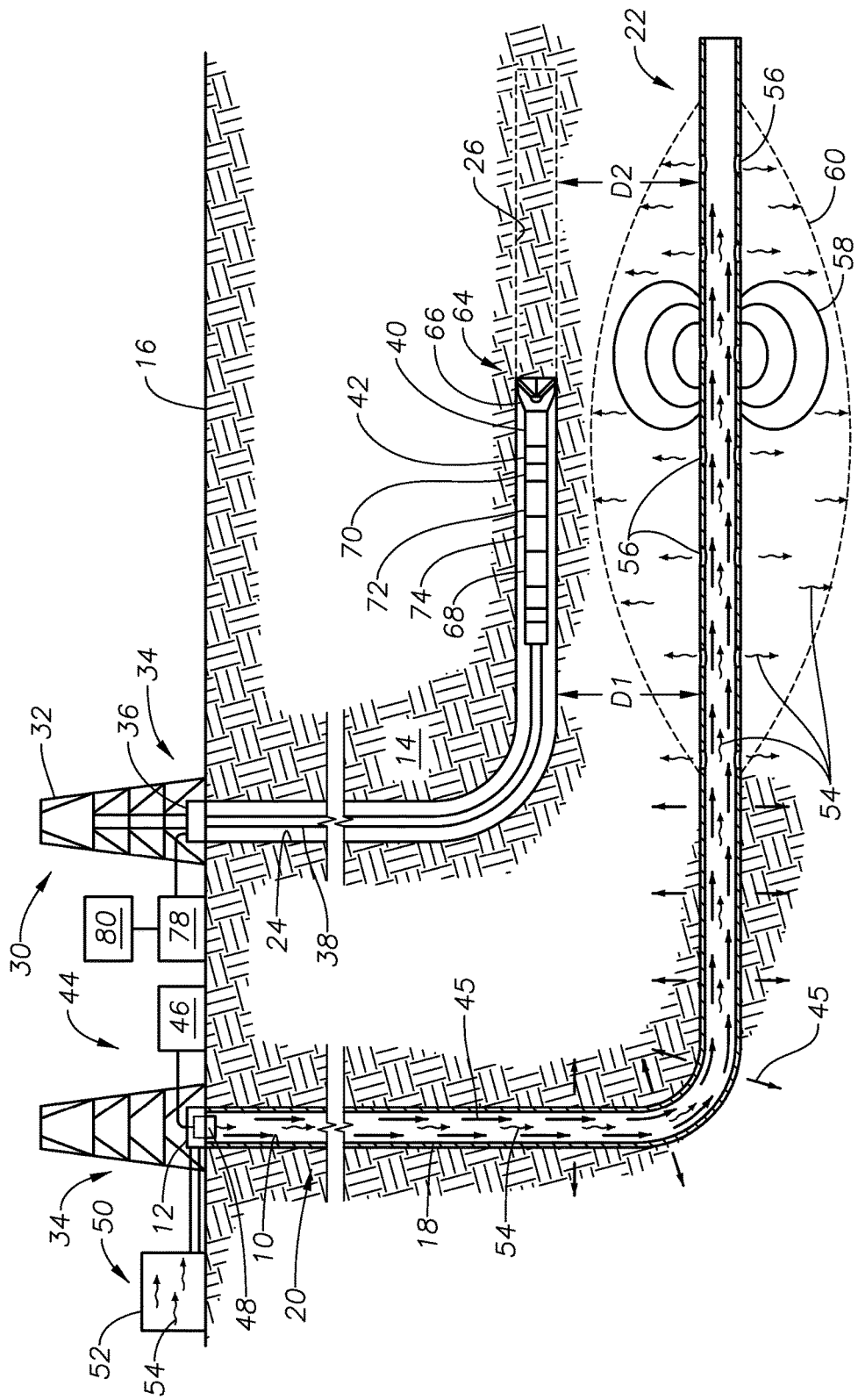
FIG. 1 illustrates a wellbore placement system employing thermal and EM measurements to optimize placement.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Optimized wellbore placement for operations such as SAGD can be achieved by a method and system that measures or estimates formation temperature around a wellbore and utilizes the measured temperature formation in conjunction with electromagnetic (EM) measurements to select a drill path based on a combination of two measurements. In some embodiments, this may result in non-parallel spacing between the two wellbores. In some embodiments, this may result in an optimized, parallel spacing between the two wellbores. In particular, EM ranging can keep the injector wellbore positioned above the producer wellbore by adjusting the relative angle, while temperature measurements can keep the wellbores at true optimum (but not necessarily fixed) distance along their respective lengths. Electromagnetic or thermal gradient measurements can also be made to improve the distance estimation. In particular, a temperature gradient based distance measurement is proposed for the first time for optimal placement of wellbores.

Referring initially to FIG. 1, a first wellbore 10 extends from a wellhead 12 into a formation 14 from the surface 16 of the formation. Disposed within wellbore 10 along at least a portion of its length is an elongated conductive member 18 which is generally oriented within wellbore 10 to be axially aligned therewith. Wellbore 10 may be cased or uncased. To the extent wellbore 10 is cased, in one or more embodiments, conductive member 18 may be a casing or liner disposed within wellbore 10. For either cased or uncased wellbores, in one or more embodiments, conductive member 18 may be a pipe string, tool string, tubing, electrical wire or other conductive body disposed in first wellbore 10. In any event, as described in more detail below, conductive member 18 provides a path for current flow along a length of a reference wellbore, and any conduction path that serves this purpose can be used. Moreover, conductive member 18 is generally disposed within wellbore 10 to radiate a magnetic field radially outward from wellbore 10.

In one or more embodiments, first wellbore 10 may include a vertical section 20 and a directional section 22. The directional section 22 is drilled from the vertical section 20 along a desired azimuthal path and a desired inclination path.

With ongoing reference to FIG. 1, there is shown a second wellbore 24 shown in the process of being drilled along a desired path 26. A drilling system 30 is generally shown associated with second wellbore 24, although a similar drilling system 30 may be utilized in drilling first wellbore 10. Drilling system 30 may include a drilling platform 32 positioned over formation 14, and a wellhead installation 34, including blowout preventers 36. Platform 32 may be disposed for raising and lowering a conveyance mechanism 38 within second wellbore 24. Although the wellbores are shown to be vertically separated in FIG. 1, in general, they could have separation in any other direction. For example, the system disclosed herein may be used in a case were a wellbore is being drilled next to one or more SAGD wellbores.

Carried by conveyance mechanism 38 in second wellbore 24 is an electromagnetic ("EM") sensor 40 and a thermal or temperature sensor 42. In one or more embodiments, the EM sensor 40 can measure at least one component of a magnetic field or the gradient of a magnetic field. In one or more embodiments, the EM sensor 40 can measure at least one component of an electric field or the gradient of an electric field. In one or more embodiments, EM sensor 40 includes at least a magnetic gradient sensor or magnetic gradiometer (receiver).

Likewise, in one or more embodiments temperature sensor 42 may comprise one or more of a thermocouple, resistive temperature device, infrared sensor, bimetallic device, thermometer, change-of-state sensor or a silicon diode. Temperature sensor 42 is thermally coupled to the formation 14 and measures the temperature of the formation 14.

A current injection system 44 is provided for driving current 45 to conductive member 18 of first wellbore 10. In one or more embodiments, current injection system 44 includes a current source 46 and one or more electrodes 48 electrically connected to the current source 46. Individual components of the current injection system 44 may be deployed in first wellbore 10, in second wellbore 24, at the surface 16 r in another location, as desired, to drive a current 45 along conductive member 18. In one or more embodiments, an electrode 48 is in direct electrically connection to conductive member 18 or a wellhead installation 34 at the top of first wellbore 10, while in other embodiments, an electrode 48 is deployed in the second wellbore 24. While optimization utilizing temperature is described in conjunction with electromagnetic ranging employing wellhead excitation, the methods and systems are not limited to a particular type of electromagnetic ranging. Thus, in one or embodiments, electrodes utilized in electromagnetic ranging may be positioned in or on the BHA in order to apply current to the target well. In this same vein, in one or more embodiments, solenoid or rotating magnet based ranging methods (MGT and RM tools of Vector Magnetics) can be used.

A thermal injection or heat delivery system 50 provides a thermal source for radiating heat from at least the first wellbore 10 into formation 14. In one or more embodiments, heat delivery system 50 is a steam injection system having a steam source 52 disposed to inject steam 54 into first wellbore 10. To the extent first wellbore 10 is cased, first wellbore 10 may be provided with perforations 56 to enhance transmission of steam 54 into formation 14. In another embodiment, heat delivery system 50 may be a resistive system for heating the formation 14. In some embodiments, the casing or conductive member 18 of the first wellbore 10 may be directly heated, thereby causing heat to radiate out into the formation.

EM sensor 40 and temperature sensor 42 deployed in second wellbore 24, together with current injection system 44 disposed to generate magnetic fields 58 about first wellbore 10 and heat delivery system 50 deployed to radiate heat from first wellbore 10, generally form a wellbore placement system disposed to optimize spacing between the two wellbores for a particular operation.

Thus, a wellbore placement system consists of two parts: (i) a current injection system 44 and EM sensor 40 disposed to generate a magnetic field 58 around a first wellbore 10 and sense magnetic fields 58 or the gradient magnetic fields in a second wellbore 24; and (ii) a heat delivery system 50 and temperature sensor 42 disposed to generate a thermal envelope 60 around a first wellbore 10 and measure formation temperatures at the second wellbore 24.

Figure 2:
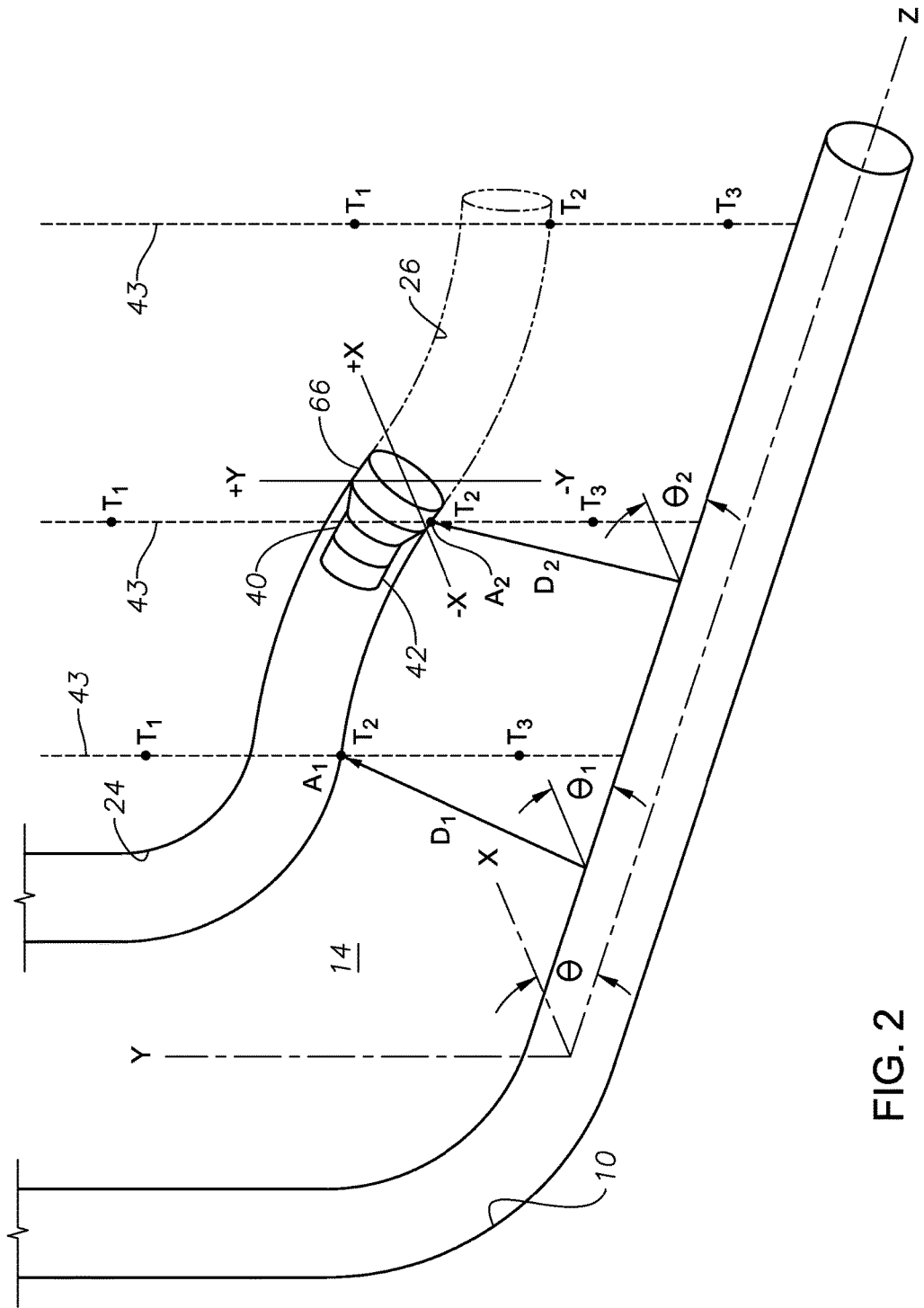
FIG. 2 illustrates first and second wellbores selected to have non-parallel paths to optimize SAGD operations.

With reference to FIG. 2 and ongoing reference to FIG. 1, current injection system 44 and EM sensor 40 are utilized to laterally position second wellbore 24 relative to first wellbore 10 by identifying an actual azimuthal angle θ between the two wellbores and adjusting the desired path 26 in a first X-X direction until a desired azimuthal angle θ is achieved. EM sensor 40 is positioned within the second wellbore 24 to sense the magnetic fields 58 emanating from the conductive member 18 in first wellbore 10. Based on the sensed magnetic fields, the range or position of second wellbore 24 relative to the first wellbore 10 is determined by calculating an azimuthal angle θ between first wellbore 10 and EM sensor 40, and a lateral correction in the X-X direction of second wellbore 24 can be implemented to guide the second wellbore to a desired azimuthal angle θ. For example, in some enhanced recovery operations, such as SAGD, it is desirable to position the second injector wellbore above the first producer wellbore, or at least within an azimuthal θ range, so that the two wellbores are in a plane that is close to if not substantially perpendicular to the horizon. In the illustration, if EM ranging determines that second wellbore 24 is not within a desired azimuthal window or range, the direction of second wellbore 24 can be adjusted in the +X or −X direction.

On the other hand, heat delivery system 50 and temperature sensor 42 are utilized to position second wellbore 24 relative to first wellbore 10 to achieve a desired distance of separation by a adjusting the desired path 26 in a second Y-Y direction. Temperature sensor 42 is disposed within the second wellbore 24 to sense the elevated formation temperature around second wellbore 24 resulting from heat delivery system 50 of first wellbore 10. Utilizing the range or position of second wellbore 24 relative to the first wellbore 10 determined with EM sensor 40, and based on formation temperature sensed with temperature sensor 42, a correction in the position of second wellbore 24 can be implemented to optimize the distance of second wellbore 24 relative to first wellbore 10. In some operations, it may be desirable for second wellbore 24 to be closer to or farther apart from first wellbore 10. In particular, given the inhomogeneous nature of formations, the optimum spacing D1 and a desired azimuthal angle $\theta_1$ (or azimuthal range) between the two wellbores at a first location A1 in the formation for a particular operation may be different than the optimum spacing D2 and a desired azimuthal angle $\theta_2$ (or azimuthal range) at a second location A2 in the formation. As such, in one or more embodiments, the position of second wellbore 24 is selected to be non-parallel and second wellbore 24 is drilled along a desired path 26 that is not parallel with first wellbore 10. In the illustration of FIG. 2, for example, at any given point between the two wellbores, a temperature gradient (represented by lines 43) in the formation may exist, where $T_1$ is the coolest temperature and $T_3$ is the warmest temperature along the gradient. In some SAGD operations, the temperature $T_1$ of formation 14 is not warm enough to achieve optimum hydrocarbon flow between the two wellbores, while the temperature T3 of formation 14 is too hot indicating direct communication of steam with the producing well. In this case, the temperature T2 of formation 14 may be the optimum temperature for a particular SAGD operation and the position of second wellbore 24 relative to first wellbore 10 is adjusted to pass through the formation having the temperature T2 by altering the desired path 26 to drive the second wellbore 24 to a desired distance of separation.

Turning back to FIG. 1, to the extent drilling system 30 is being utilized to actively drill second wellbore 24, EM sensor 40 and temperature sensor 42 may be part of the bottom-hole-assembly (BHA) 64 of a drilling system. In such embodiments, conveyance mechanism 38 may be a tubing or drill string, having a BHA 64 attached to the end of string 38. BHA 64 includes a drill bit 66. In one or more embodiments, at least one, and preferably both, EM sensor 40 and temperature sensor 42 are positioned proximate or adjacent to drill bit 66. BHA 64 may also include a power module 68, such as a mud motor, a steering module 70, a control module 72, and other sensors and instrumentation modules 74. As will be appreciated by persons of skill in the art, the BHA 64 illustrated in FIG. 1 may be a measurement-while-drilling or logging-while-drilling system in which the ranging system disclosed can be utilized to guide drill bit 66 while a drill string is deployed in wellbore 24, and more specifically, to optimize the spacing between second wellbore 24 and first wellbore 10 based on the thermal characteristics of the formation at a particular location. It will be appreciated that the optimized spacing based on thermal characteristics of the formation may lead to non-parallel wellbores. In other words, the optimum distance D1 at a first location A1 between the first wellbore 10 and second wellbore 24 may be different than the optimum distance D2 at a second location A2 between the first wellbore 10 and the second wellbore 24. Thus, D1 may be less than, greater than, or equal to D2, the optimum distance being determined in part by the temperature measurements from temperature sensor 42.

The current source 46 is, in some embodiments, either a voltage controlled or current controlled transmitter, and it alternates as very low frequencies in the order of 0.02-250 Hz to generate the current injected by electrode 48. As stated above, current source 46 may be locally positioned relative to electrode 48, or positioned at a location removed from electrode 48. Likewise, power and communications to one or both of EM sensor 40 and temperature sensor 42 may be carried locally by appropriate modules 68-74 or may be transmitted via conveyance system 38

The mud motor module 68 is driven by the drilling fluid flow, and in turn it drives the drill bit 66 to extend the second wellbore 24 along a desired path 26. Mud motor module 68 may provide power to the current injection system 44 and/or the EM sensor 40 and/or temperature sensor 42.

Steering module 70 enables the wellbore 24 to be extended in a desired direction. Many suitable steering mechanisms are well known, e.g., steering vanes, "bent sub" assemblies, and rotary steerable systems. The steering mechanism configuration can be set and adjusted by commands from a control system 78 at the surface, such as a logging truck or other control skid. Alternatively, control module 72 can be programmed with a desired route, and it can adjust the steering mechanism as needed to direct the second wellbore 24 along the desired path 26.

While the current injection system 44, EM sensor 40 and temperature sensor 42 as described herein are illustrated with respect to a drilling system 30 that is land based, the disclosure also includes use with offshore and marine drilling systems. Likewise, while conveyance mechanism 38 is depicted in FIG. 1 as a drill or tubing string, in other embodiments, conveyance mechanism 38 may be a wireline, slickline or other cable deployed to lower EM sensor 40 and temperature sensor 42 into second wellbore 24.

Moreover, deployment of the current injection system 44, EM sensor 40 and temperature sensor 42 is not limited to any particular orientation of the first and second wellbores.

As depicted in FIG. 1, first and second wellbores 10, 28, respectively are deviated towards the horizontal. In such case, current injection system, EM sensor 40 and temperature sensor 42 may be particularly useful in optimized wellbore placement for enhanced recovery operations, such as SAGD, TAGD, THAI, VAPEX production or Fire Flooding. Alternatively, in one or more embodiments, first and second wellbores 10, 28, respectively may be substantially vertical wellbores. Alternatively, in one or more embodiments, as described in more detail below, the first wellbore may be of any orientation and the second wellbore may likewise be of any orientation and drilled so as to have a particular distance or set-off from the first wellbore based on a heat source at the first wellbore and a temperature sensor in the second wellbore. Accordingly, in one or more embodiments, current injection system 44, EM sensor 40 and temperature sensor 42 may be used in drilling relief wells or intersecting wells, such as when it is desirable to establish direct fluid communication between two wells. This may be particularly useful in wellbore intervention operations, for example.

In any event, a control system 80 may also be deployed to control drilling system 30 based on EM ranging utilizing current injection system 44, heat delivery system 50, temperature sensor 42 and EM sensor 40.

Figure 3:
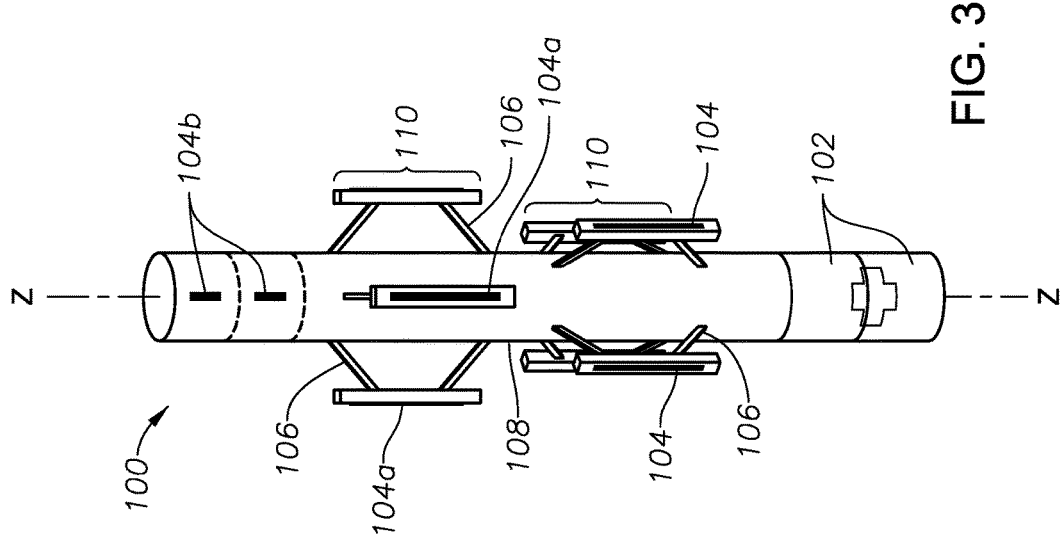
FIG. 3 illustrates some embodiments of a logging-while-drilling collar used to optimize wellbore placement.

With reference to FIG. 3, there is shown a logging-while-drilling collar 100 used to optimize wellbore placement as described herein. Logging-while-drilling collar 100 is disposed in the wellbore being drilled, such as second wellbore 24 shown in FIG. 1. In some embodiments, collar 100 may, for example, comprise a portion of BHA 64 shown in FIG. 1. In any event, collar 100 includes one or more EM sensors 102. In one or more embodiments, EM sensor 102 may be one of the following and may be combined with one or more of the following: magnetometer, magnetic gradient sensor, magnetic gradiometer, atomic magnetometers, flux-gate magnetometers, magnetic gradiometers, solenoids or coils. In some embodiments, EM sensor 102 is positioned to be adjacent or in close proximity to the drill bit (see FIG. 1) used in association with the logging-while-drilling collar. EM sensor 102 may be disposed to measure absolute magnetic fields or magnetic field gradients depending on the type of EM sensor utilized. In some embodiments, EM sensor 102 measures the absolute magnetic field in at least two different orientations to detect the orientation of the first wellbore from which magnetic field is emanating. In some embodiments, EM sensor 102 may also have the capability to measure the gradient magnetic field through the use of multiple magnetometers with the same orientation. This can give additional information about the distance to the producer which can improve decision making process and provide a fail-safe mechanism in case of failure of the temperature sensors.

In one or more embodiments, collar 100 may include two or more EM sensors 102 axially spaced apart from one another along the length of collar 100. In one or more embodiments, EM sensor 102 may have multiple dipoles, such as 2-dipoles, 3-dipoles, 4-dipoles or more, arranged about a primary axis Z of collar 100. In the case of multiple dipoles, the dipoles may be uniformly spaced from one another about a primary axis Z. As used herein, dipole means an antenna or electrode formed of elongated coil of wire disposed along a dipole axis and having a multiplicity of turns of wire about a core.

Collar 100 also includes one or more temperature sensors 104. Temperature sensor 104 may be a radiation, contact or derivative device. Radiation or non-contact temperature sensors rely on IR radiation from the mud and wellbore wall to determine the temperature of the wall, i.e., the temperature of the formation in proximity to the wellbore. Contact temperature sensors typically utilize a resistive element in contact with the mud or wellbore wall. The resistive element produces an electrical signal with changes in the temperature of the mud or wall. Derivative temperature sensors measure changes in resistance of the cuttings and the mud in the wellbore to estimate the changes in the temperature of the wellbore wall. In one or more embodiments, temperature sensor 104 may be one of the following and may be combined with one or more of the following: thermocouples, resistive temperature devices (RTDs, thermistors), infrared radiators, bimetallic devices, liquid expansion devices, and silicon diodes. In one or more embodiments, temperature sensor 104 may be a resistivity tool. Such a resistivity tool may include an injector electrode, a return electrode, a guard electrode and a current source. In any event, temperature sensor 104 is utilized to measure the increase in the formation temperature around the second wellbore due to the presence of a thermal source in the first wellbore. In some embodiments, the thermal source is steam injected into the formation from the first wellbore, and the steam migrates through the formation to the second wellbore, thereby heating the formation between the two wellbores.

In one or more embodiments, multiple temperature sensors 104 may be deployed in spaced apart relationship to one another about the perimeter of collar 100 to measure the azimuthal temperature about the collar. In one or more embodiments, a single, non-azimuthal temperature sensor 104 may be utilized, while in other embodiments, multiple temperature sensors 104 may be deployed on collar 100 to measure a specific segment of the formation.

In one or more embodiments, a temperature sensor 104 may be mounted at the distal end of an extendable mechanism 106, such as an arm or screw, disposed to extend temperature sensor 104 from a collar body or elongated housing 108 thereby permitting temperature sensor 104 to contact or engage the wellbore wall. In some embodiments, drilling and mud flow can be suspended while the extendable mechanism 106 is deployed and resumed when the extendable mechanism 106 is retracted. In alternative embodiments, rather than utilizing an extendable mechanism 106, temperature sensor 104 can be placed on an extruded section of the well with some or no stand-off, such as centralizers (not shown).

In some embodiments, collar 100 may include at least two or more temperature sensors 104. In these embodiments, the temperature sensors 104 may be spaced radially about collar body 108 and/or axially along the length of collar body 108.

In some embodiments, a first temperature sensor 104a may be disposed for one type of temperature measurement, and a second temperature sensor 104b may be disposed for another type of temperature measurement. In some embodiments, one or more first temperature sensors 104a are contact temperature sensors disposed for contact with a wellbore wall, while one or more second temperature sensors 104b are disposed to measure the temperature of fluid in the wellbore.

In some embodiments, collar 100 may include one or more arrays 110 of temperature sensors 104. Shown in FIG. 3 is a first temperature sensor array 110a and a second temperature sensor array 110b, axially spaced apart from one another along collar body 108. Each array 110 may include two or more temperature sensors 104. In one or more embodiments, each array includes multiple temperature sensors 104 spaced apart uniformly from one another around the perimeter of collar 100. In one or more embodiments, an array 110 may include four temperature sensors 104 uniformly spaced at 90 degrees from one another.

Persons of ordinary skill in the art will appreciate that with two or more temperature sensors 104, the multiple temperature sensors 104 may be utilized to (i) make gradient measurements, such as may be used for distance and direction calculation; and/or (ii) make time-lapse measurements to apply steady state corrections.

Figure 4:
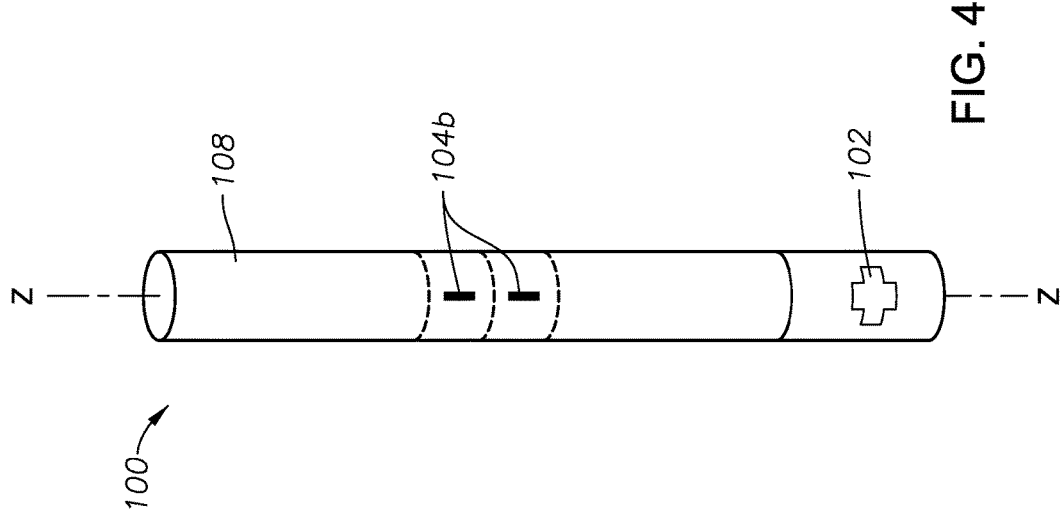
FIG. 4 illustrates some embodiments of a wellbore placement optimization tool for use in wireline or logging-while-drilling operations.

In one or more embodiments, a temperature sensor 104 may be mounted on collar body 108 and disposed to measure the temperature of the wellbore fluid. In FIG. 3 and FIG. 4, one or more temperature sensor 104b are mounted on collar body 108 and disposed to measure wellbore fluid. In standard drilling operations, it has been found that drilling mud in a wellbore functions as a good conductor of heat and can quickly become representative of nearby formation temperature. As shown in FIGS. 3 and 4, two or more temperature sensors 104b may be deployed and spaced apart from one another along the length of collar body 108.

Magnetic Ranging

Determination of the distance and direction of the conductive member relative to the second wellbore is based on the magnetic fields received by one or more EM sensors 40, 102. As stated above, an EM sensor 40, 102 may be a magnetometer disposed to measure an absolute magnetic field or a receiver may be a magnetic gradient sensor (or magnetic gradiometer) disposed to measure magnetic field gradients.

In any event, determination of distance and direction is achieved by utilizing the relationship below between the conductive member and the magnetic field received by the EM sensor(s).

$$\bar{H} = \frac{I}{2\pi r}\hat{\phi} \tag{1}$$

H is the magnetic field vector, I is the current on the conductive member, r is the shortest distance between the EM sensor(s) and the conductive member and $\phi$ is a vector that is perpendicular to both z axis of the EM sensor(s) and the shortest vector that connects the conductive member to the EM sensor(s). It should be noted that this simple relationship assumes constant conductive member current along the conductive member, however, persons of ordinary skill in the art will appreciate that the concept can be extended to any current distribution by using the appropriate model. It can be clearly seen that both distance and direction can be calculated by using this relationship.

$$r = \frac{I}{2\pi|\bar{H}|} \tag{2}$$

$$\Phi = \text{angle}(\hat{x} \cdot \bar{H}, \hat{y} \cdot \bar{H}) + 90 \tag{3}$$

where · is the vector inner-product operation. It has been observed by experience that Equation (3) is a reliable measurement of the relative direction of the conductive member with respect to EM sensor(s) coordinates and it can be used as long as signal received from the conductive member is substantially large compared to the measurement errors. However, in some operations, Equation (2) cannot be reliably used to calculate distance since a direct or accurate measurement of I does not exist. Specifically, it has been observed that any analytical calculation of I can be 50% off due to unknown conductive member characteristics. Furthermore, any in-situ calibration of I may not produce a system reliable enough to be used in the SAGD or wellbore intercept application due to variations in conductive member current due to changing formation resistivity and skin depth at different sections of a wellbore.

To address the foregoing, magnetic field gradient measurements are utilized, where spatial change in the magnetic field is measured in a direction that has a substantial component in the radial (r-axis) direction as below:

$$\frac{\partial \bar{H}}{\partial r} = -\frac{I}{2\pi r^2}\hat{\phi} \tag{4}$$

where $\partial$ is the partial derivative. With this gradient measurement available in addition to an absolute measurement, it is possible to calculate the distance as follows:

$$r = \frac{|\bar{H}|}{\left|\frac{\partial \bar{H}}{\partial r}\right|} \tag{5}$$

As such, Equation (5) does not require knowledge of the conductive member current I, if both absolute and gradient measurements are available. The direction measurement can still be made as shown in Equation (3).

In practical implementation it is not feasible to measure all components of the magnetic field which are required for making use of all of the above formulas. Instead a single component of the magnetic field that is oriented in direction u can be used. The magnetic field for such component can be written as:

$$H \cdot \hat{u} = \frac{I}{2\pi r}(\hat{u} \cdot \hat{\phi}) \tag{6}$$

where hat sign indicates unit vectors and bar indicates vectors. Similarly, the u-component magnetic field gradient along v direction can be written as:

$$\frac{\partial \bar{H} \cdot \hat{u}}{\partial v} = \frac{\partial \frac{I}{2\pi r}\hat{\phi} \cdot \hat{u}}{\partial v} = \frac{I}{2\pi}\frac{\partial \frac{1}{r}\hat{\phi} \cdot \hat{u}}{\partial v} = \frac{I}{2\pi}\frac{\partial \frac{1}{r}\hat{\phi}}{\partial v} \cdot \hat{u} \tag{7}$$

$$= \frac{I}{2\pi}\left(\frac{\partial \frac{1}{r}}{\partial v}\hat{\phi} + \frac{1}{r}\frac{\partial \hat{\phi}}{\partial v}\right) \cdot \hat{u} =$$

$$\frac{I}{2\pi}\left(-(\hat{v} \cdot \hat{r})\frac{1}{r^2}\hat{\phi} - \frac{1}{r}|\hat{v} \cdot \hat{\phi}|\frac{\hat{r}}{r}\right) \cdot \hat{u}$$

$$= -\frac{I}{2\pi r^2}\left((\hat{v} \cdot \hat{\phi})(\hat{u} \cdot \hat{r}) + (\hat{v} \cdot \hat{r})(\hat{u} \cdot \hat{\phi})\right)$$

With these absolute and gradient measurements available, distance to conductive member can be written as:

$$\frac{\overline{H}\cdot\hat{u}}{\frac{\partial \overline{H}\cdot\hat{u}}{\partial v}} = -r\frac{(\hat{u}\cdot\hat{\phi})}{((\hat{v}\cdot\hat{\phi})(\hat{u}\cdot\hat{r})+(\hat{v}\cdot\hat{r})(\hat{u}\cdot\hat{\phi}))} \quad (8)$$

where $$\hat{r}=\hat{x}\cos(\Phi)+\hat{y}\sin(\Phi)$$

$$\hat{\phi}=-\hat{x}\sin(\Phi)+\hat{y}\cos(\Phi) \quad (9)$$

In an example case, where $H_y$ component is measured along x, Equation (7-9) can be combined as following:

$$\frac{H_y}{\frac{\partial H_y}{\partial x}} = r\frac{\cos(\Phi)}{(\sin(\Phi)^2-\cos(\Phi)^2)} \quad (10)$$

Finally distance can be written as:

$$r = \frac{H_y}{\frac{\partial H_y}{\partial x}}\frac{(\sin(\Phi)^2-\cos(\Phi)^2)}{\cos(\Phi)} \quad (11)$$

The gradient field in Equation (11) is realized in practice by utilizing finite difference of two magnetic field dipole measurements as shown below:

$$r = \frac{H_y}{\frac{H_y\left(x+\frac{\Delta x}{2},y\right)-H_y\left(x-\frac{\Delta x}{2},y\right)}{\Delta x}}\frac{(\sin(\Phi)^2-\cos(\Phi)^2)}{\cos(\Phi)} \quad (12)$$

However, as can be seen from Equation (10), gradient measurement with a single component becomes unstable due to singularity of the denominator every 90° starting from 45°. As a result, gradient measurement with a single component is only sensitive to angles 90°×k, where k is an integer.

Thermal Ranging

Even though it is not mandatory, temperature measurements can be used to calculate distance and direction to the target well to be used in addition to or combination with EM ranging or as an alternative to EM ranging in some operations. The temperature due to a line heat source in a medium can be written as $$T(t,r) = T_0 + \frac{Q}{4\pi k}\int_{\frac{r^2}{4at}}^{\infty}\frac{e^{-t}}{t}dt \quad (13)$$

$$\approx T_0 + \frac{Q}{4\pi k}\left(-\gamma - \ln\left(\frac{r^2}{4at}\right)\right)$$

$$\approx T_0 + \frac{-Q}{4\pi k}\ln\left(\frac{r^2}{4at}\right)$$

where $T_0$ is the initial temperature, Q is source power for unit length (W/m), k is the thermal conductivity, r is the radial distance from the heat source to the observation point, a is thermal diffusivity and t is elapsed time. It can be seen from the equation that the temperature follows a logarithmic profile which flattens out as time progresses. The temperature gradient can be calculated as $$\frac{\partial T(t,r)}{dr} \approx -\frac{Q}{2\pi kr} \quad (14)$$

Ratio of total change in the temperature to the gradient can be found as $$\frac{T(t,r)-T_0}{\frac{\partial T(t,r)}{dr}} = \frac{\frac{1}{2}\ln\left(\frac{r^2}{4at}\right)}{\frac{1}{r}} \underset{L'Hopital's\ Rule}{=} \frac{\frac{1}{2}\left(\frac{4at}{r^2}\right)\frac{2r}{4at}}{-\frac{1}{r^2}} = r \quad (15)$$

It can be found that this ratio gives a good estimation of the distance to the source. It should be noted here that this formula is valid only for a homogeneous formation and it may vary in case of variations in material properties. In such case with variations, the estimated distance will not be a good representation of the true spatial distance but a "thermal" distance which could also be used for optimal placement. For example, wells could be placed at constant thermal distances instead of spatial distances.

The azimuthal direction to the heat source can be calculated as follows $$T(t,r) \approx T_0 + \frac{-Q}{4\pi k}\ln\left(\frac{x^2+y^2}{4at}\right) \quad (16)$$

$$\frac{\partial T(t,r)}{\partial x} \approx \frac{-Q}{4\pi k}\frac{1}{\left(\frac{x^2+y^2}{4at}\right)}\frac{2x}{4at} = \frac{-Q}{2\pi k}\frac{x}{x^2+y^2} = \frac{-Q}{2\pi kr}\cos\theta \quad (17)$$

$$\frac{\partial T(t,r)}{\partial y} \approx \frac{-Q}{4\pi k}\frac{1}{\left(\frac{x^2+y^2}{4at}\right)}\frac{2y}{4at} = \frac{-Q}{2\pi k}\frac{y}{x^2+y^2} = \frac{-Q}{2\pi kr}\sin\theta \quad (18)$$

$$\theta = \tan^{-1}\left(\frac{\frac{\partial T(t,r)}{\partial y}}{\frac{\partial T(t,r)}{\partial x}}\right) = \cot^{-1}\left(\frac{\frac{\partial T(t,r)}{\partial x}}{\frac{\partial T(t,r)}{\partial y}}\right) \quad (19)$$

All of the temperature gradients in the equations can be calculated by using a finite difference of temperature values at different azimuthal positions along the borehole.

Figure 5:
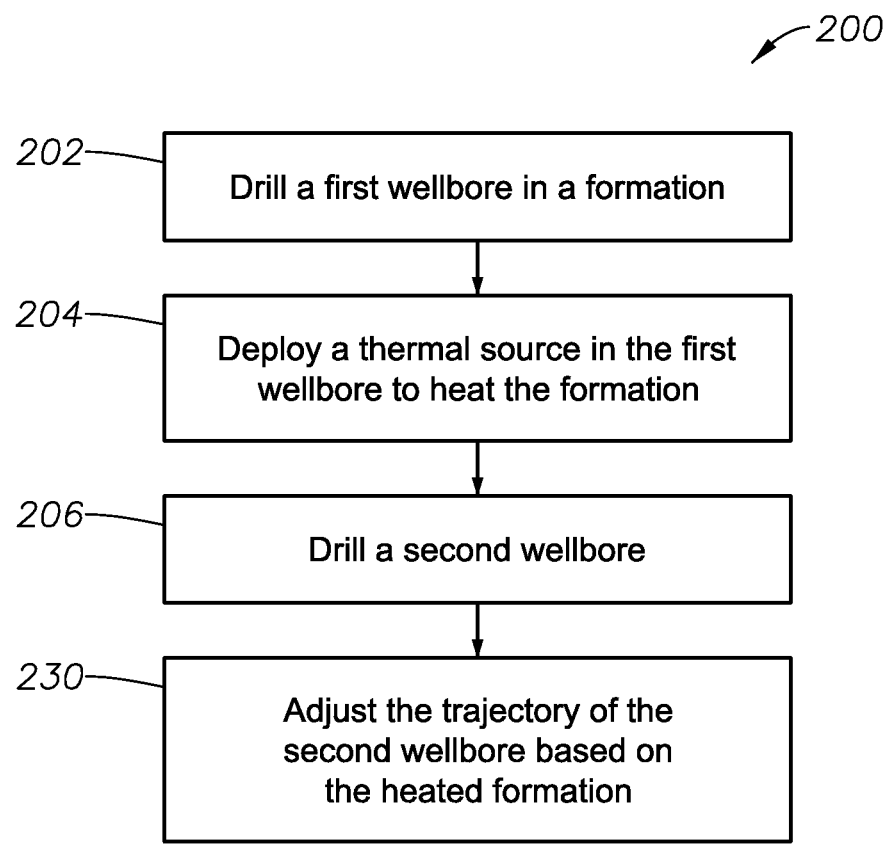
FIG. 5 illustrates the heating steps in a SAGD operation.
Figure 6:
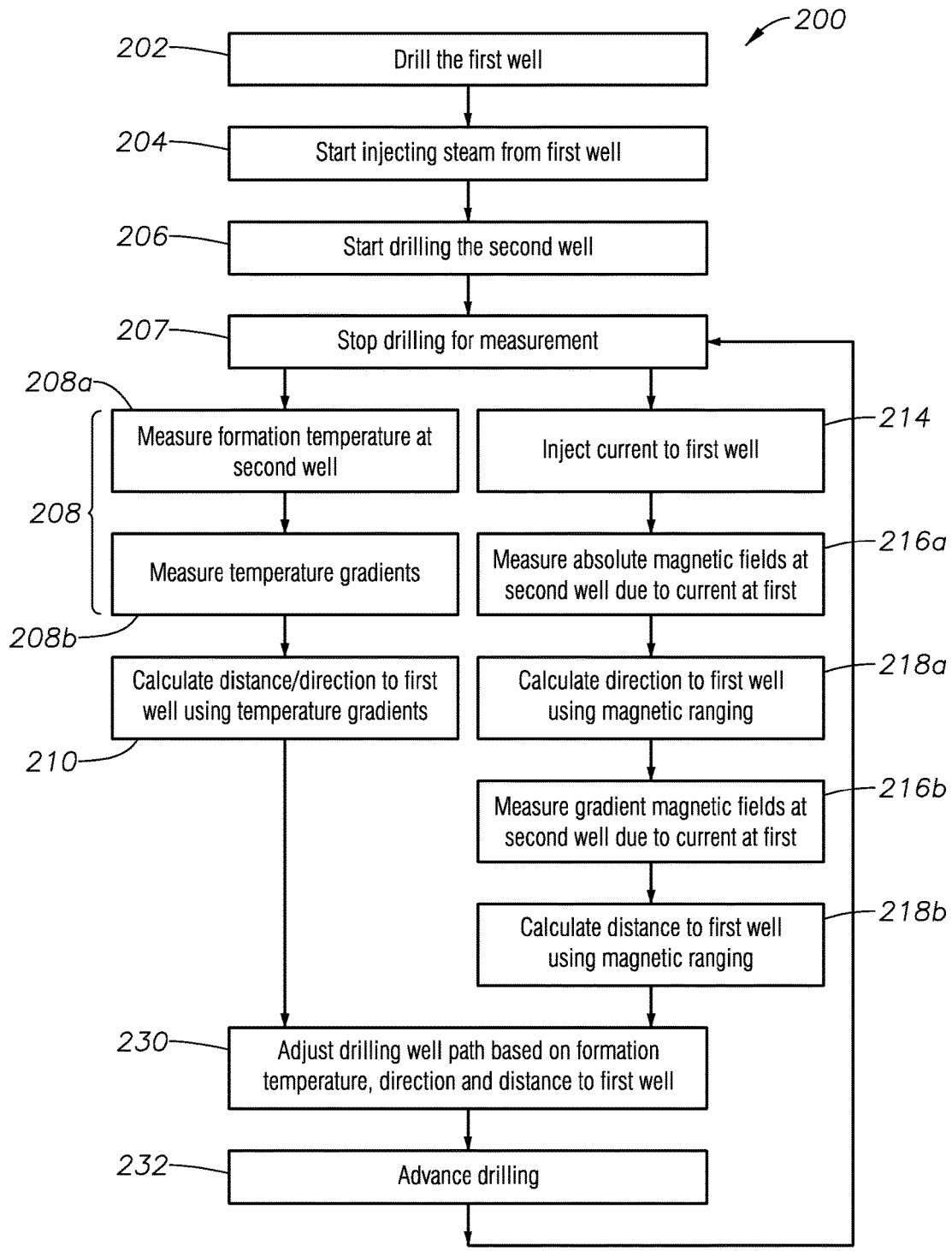
FIG. 6 is a flow chart illustrating some embodiments of a wellbore placement optimization method using thermal and EM measurements.

In light of the foregoing, and with reference to FIGS. 5 and 6, therefore, a wellbore placement method 200 generally includes the step 202 of drilling a first wellbore in the formation. The wellbore may be cased or uncased. In one or more embodiments, at least a portion of the wellbore is deviated or substantially horizontal. Next, in step 204, a thermal source is deployed in the first well to heat the formation around the first wellbore and form a thermal envelope around the first wellbore. In some embodiments, the thermal source may be steam injected into the first wellbore to form a steam envelope or another heated fluid provided in the first wellbore. In other embodiments, the thermal source may be another mechanism for heating the formation. As a non-limiting example, in some embodiments, a portion of the casing may be directly or indirectly heated in order to heat the formation. In any event, the thermal source forms a heated envelope or area around the first wellbore, increasing the viscosity of the hydrocarbons, which results in an increase in mobility of the hydrocarbons.

As heat from the thermal source is transferred to the formation, it will be appreciated that difference in the formation at any given location will affect the heat absorption and transmission at the location. The temperature distribution around the wells is usually not uniform and it may vary based on the geological and petrophysical properties of the rocks. In other words, the formation is not uniformly heated at a uniform distance from the first wellbore. Rather, the temperature gradient about the first wellbore differs along the length of the wellbore. As such, and as illustrated in FIG. 2, the optimum formation temperature T for a particular operation, such as SAGD, along a wellbore may be at a first location A1 at a distance D1 and azimuthal angle $\theta_1$ (or azimuthal range) from the first wellbore and, farther along length of the wellbore, at a second location A2 at a distance D2 and azimuthal angle $\theta_2$ (or azimuthal range) from the wellbore, where the distances D1 and D2 may differ and/or the azimuthal angles $\theta_1$ and $\theta_2$ may differ. Thus, it will be appreciated that a second wellbore should be drilled to pass through each of the first and second locations so as to be at a distance D1 and/or the azimuthal angles $\theta_1$ from the first wellbore at the first location A1 and to be at a distance D2 and/or the azimuthal angles $\theta_2$ from the first wellbore at the second location A2, thereby optimizing placement of the second wellbore based on the optimum formation temperature T.

With this in mind, in step 206, drilling of a second wellbore is initiated. During the process of drilling the second wellbore, in step 208, a thermal characteristic of the formation, such as a temperature measurement, around the second wellbore is determined. In one or more embodiments illustrated in step 208a, the thermal characteristic is a measurement of formation temperature taken from within the second wellbore. Alternatively, or in addition to step 208a, in one or more embodiments illustrated in step 208b, the thermal characteristic is a measurement of the temperature gradients taken from within the second wellbore. The temperature measurement is taken to determine or estimate the temperature of the formation around the second wellbore. As described above, the temperature may be a direct measurement made by contacting a sensor with the wellbore wall, or may be made by non-contact temperature sensors. Alternatively, wellbore fluid temperature may be measured and used to estimate the formation temperature.

In step 230, the measured temperature is utilized to determine placement of the second wellbore by determining a desired separation distance between the two wellbores based on the measured temperature and adjusting the trajectory of the second wellbore to achieve the desired separation distance. More specifically, the thermal and EM measurements may be utilized locally or communicated to the surface through a telemetry system, where an operator examines the values and makes a drilling determination about the drill path and in which direction to steer the wellbore to achieve a desired separation distance selected based on an optimum formation temperature for a particular process. In particular, the measured temperature is utilized, at step 210, to determine optimum spacing or distance between the first and second wellbores at a given location. The distance to the first wellbore from the second wellbore may be calculated using the temperature measurements, and in particular, the formation temperature and/or temperature gradient. Based on the measured temperature, the trajectory of the second wellbore is altered or adjusted so that the second wellbore will pass through a formation "hotspot" i.e., a particular location in the formation where the formation temperature T for a particular hydrocarbon recovery operation is at an optimum or within an optimum temperature range. In this regard, as the second wellbore is drilled, the path of the second wellbore may be parallel (substantially uniform separation distance) or non-parallel (varied separation distance) with respect to the first wellbore. Thus, in one or more embodiments, the second wellbore is drilled so as to have a varied separation distance or range with respect to the first wellbore based on the measured temperature along at least a portion of the length of the second wellbore. The trajectory, and thus, the separation distance along the length of at least a portion of the wellbores, is adjusted based on the heat source in the first wellbore and the temperature gradient between the first and second wellbores.

In one or more embodiments, in step 216, a magnetic characteristic between the first and second wellbores may be determined. In this regard, at step 214, a current may be applied to the first wellbore, thereby causing a magnetic field to emanate from the first wellbore. One or more EM sensors placed in the second wellbore may be utilized to measure a magnetic field, such as at step 216a and/or magnetic gradient 216b resulting from the first wellbore. The measured magnetic characteristics may be used to determine a range, such as at step 218, between the first and second wellbores, and in particular, an azimuthal angle $\theta$ between the two wellbores. The range determination may include determination of a direction or azimuthal angle $\theta$, such as at step 218a, and in some embodiments, may also additionally include a determination of a distance, such as at step 218b, to the first wellbore. The range may have a lateral component and a vertical component.

In those embodiments where both a thermal characteristic and a magnetic characteristic are determined, the drilling path or trajectory of the second wellbore may be altered or adjusted azimuthally based on the magnetic characteristic and may be altered or adjusted in separation distance based upon the thermal characteristic. In other words, the distance between the wells is controlled based on the thermal measurement (adjust distance until a desired temperature level is obtained) and the azimuth between the wells is controlled based on EM measurement (adjust azimuth until a desired azimuth is obtained).

In one or more embodiments, drilling may be suspended, such as at step 207, prior to determination of the thermal characteristic or magnetic field or gradient measurements. Once appropriate trajectory corrections are made utilizing the thermal and/or magnetic data (step 230), drilling is resumed along the corrected trajectory, as at step 232. One or more of these steps may be repeated as desired, such as for example, after a predetermined length of the second wellbore has been drilled.

Figure 7A:
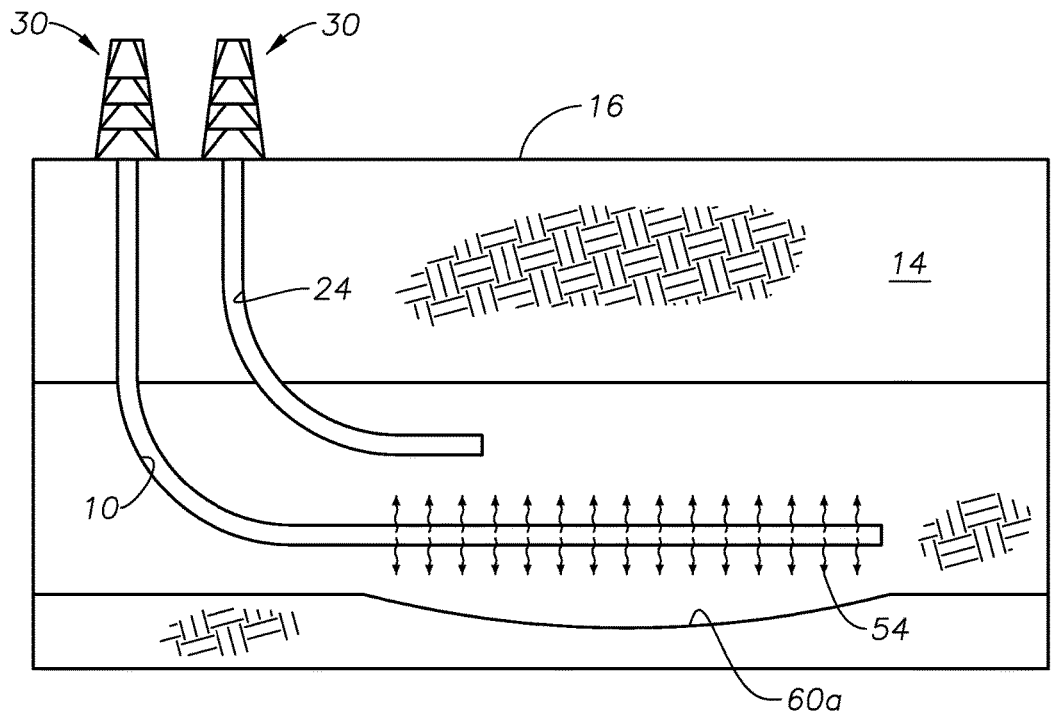
FIG. 7a, 7b and 7c, illustrate some embodiments of a SAGD operation that can benefit from the principles of this disclosure.
Figure 7B:
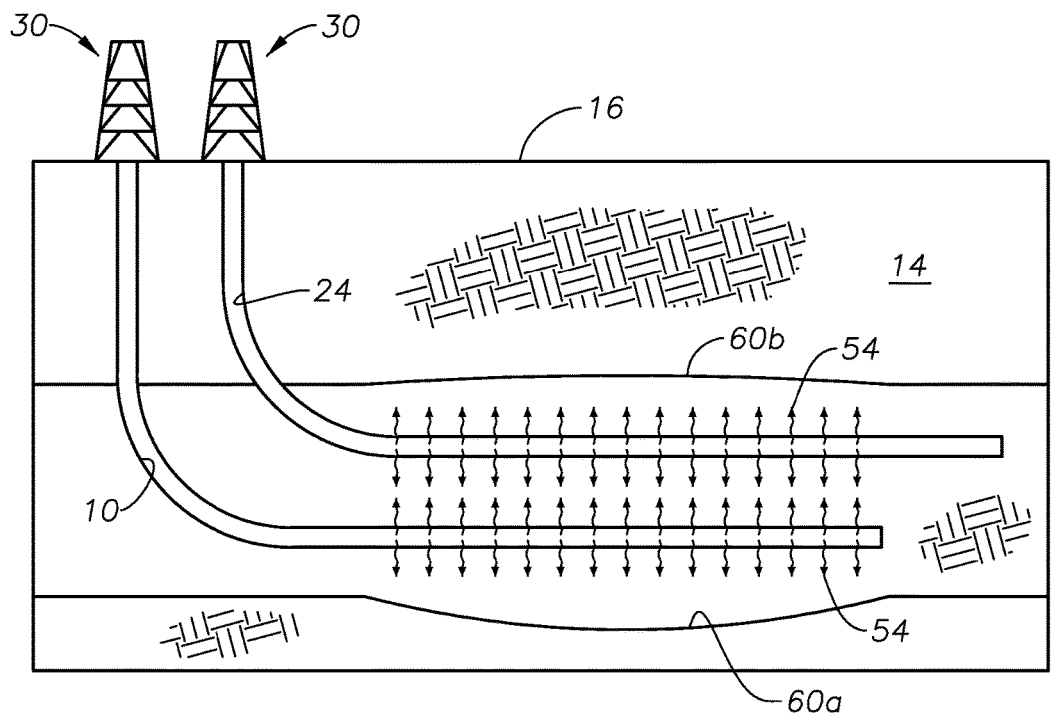
Figure 7C:
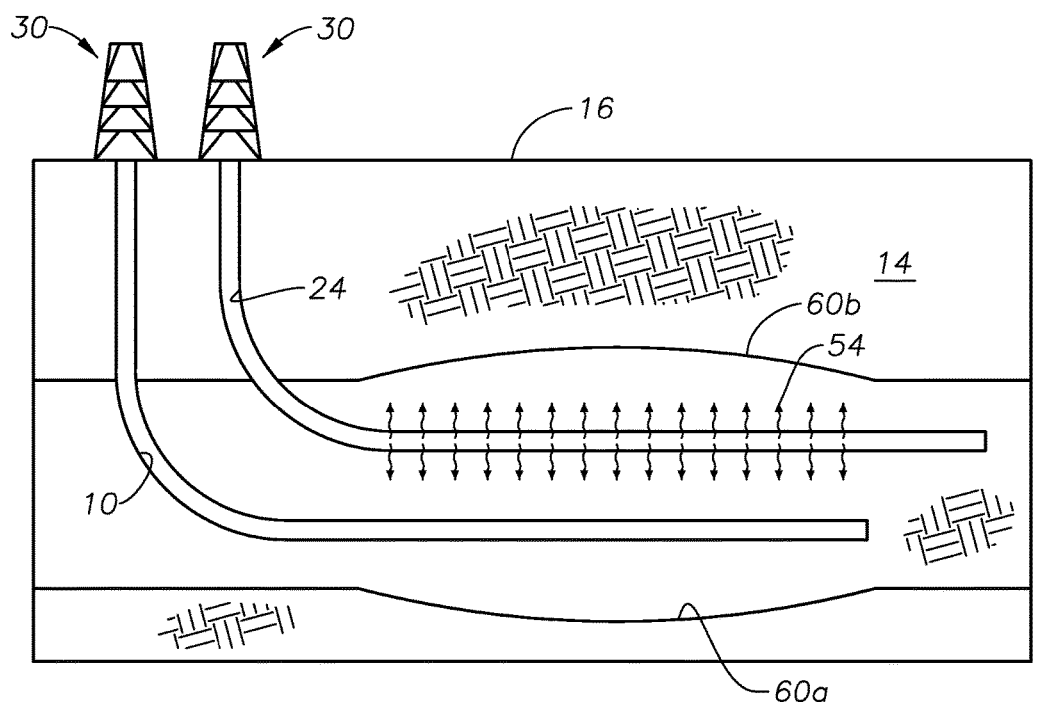

In one or more embodiments, the preceding may be particularly useful in SAGD operations. With reference to FIGS. 7a, 7b and 7c, a particular SAGD operation is illustrated. As described above, and as shown in FIG. 7a, a first wellbore 10 is drilled and a thermal source is deployed in the first wellbore. In one or more embodiments, the thermal source may be steam 54 injected into the first wellbore 10, thereby heating the formation around first wellbore 10 and forming a thermal envelope 60a around first wellbore 10. Thereafter, the second wellbore 24 is drilled. Following drilling of the second wellbore, as shown in FIG. 7b, a thermal source is deployed in the second well. In one or more embodiments, the thermal source may be steam 54 injected into the second wellbore 24, thereby heating the formation around second wellbore 24 and forming a thermal envelope 60*b* around second wellbore 24. While the thermal source may be steam injected into the wellbore to form a steam envelope, in other embodiments, the thermal source may be another heated fluid provided in one or both of the wellbores. Likewise, in other embodiments, the thermal source may be another mechanism for heating the formation. As a non-limiting example, in some embodiments, a portion of the casing in the second wellbore, if any, may be directly or indirectly heated in order to heat the formation. In any event, the thermal source in the second wellbore forms a heated envelope or area around the second wellbore. Since placement of the second wellbore was selected based on the thermal envelope around the first wellbore, the thermal envelopes of the first and second wellbores overlap, as shown in FIG. 7*b*, thereby establishing fluid communication between the two wellbores. Thus, in some embodiments, deploying a heat source in each of the first and second wellbores may include injecting steam in each of the first and second wellbores and establishing overlapping steam envelopes between each of the first and second wellbores.

Finally, as illustrated in FIG. 7*c*, with the overlapping envelopes having heated the formation around the two wellbores, SAGD operations may be continued by injecting steam 54 into the second wellbore 24 and recovering hydrocarbons from the first wellbore 10.

In addition to SAGD, the wellbore placement system and method as described is particularly well suited for conducting other advanced recovery operations such as TAGD, THAI, VAPEX and fire flooding. Likewise, the wellbore placement and method is suited for well re-claiming. In some cases, a producer or an injector well may fail due to a variety of reasons during SAGD production. The methods and systems as described herein can be used to drill a third well to replace the failed well (either producer or injector). In this same vein, a new pair of injector and producer wellbores needs to be drilled next to an existing pair (or pairs) of injector and producer wellbores, which is (or are) already producing. This may occur in case the existing pair (or pairs) of injector and producers are inadequate to effectively recover the hydrocarbons in the reservoir or do not have optimized placement as described herein.

The foregoing embodiments of systems and methods as described are provided because due to lateral variations in the geological and thermal properties of the rocks, a fixed distance cannot always ensure optimal production. Thus, it has been found that magnetic measurements can be utilized to determine lateral placement of a wellbore while temperature measurements can be used to determine vertical placement of the wellbore after the producer wellbore is heated. This allows the operator to place the second wellbore at the "true" optimum distance from the first wellbore to better ensure desired viscosity, rather than heuristically determining a placement. In addition, methods to determine distance and direction to a well by making azimuthal measurements can be used in conjunction with the above method to make improved well placement decisions.

Thus, a wellbore placement system has been described. Embodiments of the wellbore placement system may generally include a first wellbore with an elongated conductive member disposed therein; a heat delivery system in communication with the first wellbore; a current injection system disposed to delivery current to the elongated conductive member; a second wellbore; an EM sensor in the second wellbore; and a thermal sensor in the second wellbore. For any of the foregoing embodiments, the system may include any one of the following elements, alone or in combination with each other:

A heat delivery system comprises a source of steam.
    A thermal sensor is a contact sensor.
    A thermal sensor is a thermocouple.
    A thermal sensor is a thermistor.
    A thermal sensor is carried on the distal end of an extendable mechanism.
    A thermal sensor is a non-contact sensor.
    A non-contact sensor is a resistance temperature detector (RTD).
    A thermal sensor is a resistivity tool.
    A resistivity tool comprises an injector electrode, a return electrode, a guard electrode and a current source.
    An elongated housing in the second wellbore and at least two thermal sensors spaced apart along the housing.
    At least two magnetometers in the second wellbore.
    An elongated housing in the second wellbore and at least four thermal sensors uniformly spaced from one another about a perimeter of the housing.
    A first array of thermal sensors, the first array comprising at least two thermal sensors uniformly spaced from one another about a perimeter of the housing.
    A second array of thermal sensors, the second array comprising at least two thermal sensors uniformly spaced from one another about a perimeter of the housing and axially spaced apart from the first array.
    A current injection system comprises a current source electrically connected to an electrode.
    An electrode is disposed in the second wellbore.
    The electrode is electrically connected to the elongated conductive member.
    The EM sensor and thermal sensor are carried on a conveyance vehicle selected from the group consisting of wireline, slickline, or coiled tubing.
    The EM sensor and thermal sensor are carried on a drillstring deployed in the second wellbore.
    A bottom hole assembly and a drill bit.
    The EM sensor and the thermal sensor are part of the bottom hole assembly.

Thus, a wellbore placement method has been described. Embodiments of the wellbore placement method may generally include drilling a first wellbore in a formation; deploying a thermal source within the first wellbore; and drilling a second wellbore by adjusting the trajectory of the second wellbore based on the thermal source. In other embodiments, a wellbore placement system may generally include determining a magnetic characteristic between a first wellbore and a second wellbore; determining a thermal characteristic between the first and second wellbore; utilizing the magnetic characteristic to determine an azimuth angle between the first and second wellbores; and utilizing the thermal characteristic to select a distance between the two wellbores. For any of the foregoing embodiments, the method may include any one of the following, alone or in combination with each other:

Determining a magnetic characteristic between a first wellbore and a second wellbore; determining a thermal characteristic between the first and second wellbore; utilizing the magnetic characteristic to select an azimuthal range between the first and second wellbores; utilizing the thermal characteristic to select a distance between the two wellbores; and drilling the wellbore to have the selected azimuthal range and selected distance.

Drilling a first wellbore; deploying a thermal source in the first wellbore; initiating drilling of the second wellbore; utilizing an EM sensor in the second wellbore to measure a magnetic field; and utilizing a temperature sensor in the second wellbore to measure a temperature.

Utilizing the measured temperature to estimate a formation temperature adjacent the second wellbore.

Prior to the steps of utilizing, suspending drilling of the second wellbore; based on the measured temperature, adjusting the trajectory of the second wellbore; and following adjustment of the trajectory, continuing drilling of the second wellbore.

Deployment of a thermal source comprises providing a heated fluid into the first wellbore.

Providing a heated fluid into the first wellbore comprises injecting steam into the first wellbore.

Deployment of a thermal source comprises positioning a heating apparatus in the first wellbore.

A heating apparatus is casing disposed in the first wellbore.

Drilling the second wellbore so as to have a varied separation distance based on the measured temperature to the first wellbore along at least a portion of the length of the second wellbore.

Drilling the second wellbore so as to have a varied range to the first wellbore based on the thermal characteristic.

Drilling the second wellbore so as to have a varied azimuthal range to the first wellbore along at least a portion of the length of the second wellbore based on the magnetic characteristic.

Measuring a temperature in the second wellbore and utilizing the temperature to adjust the distance between the wellbores so that the second wellbore at a select location along its length is within a desired temperature range.

Making an electromagnetic ranging measurement; determining an azimuth angle to target from the electromagnetic ranging measurement; and adjusting the trajectory of the second wellbore so that the second wellbore at a select location along its length is within a desired azimuthal range.

Determining a distance from the electromagnetic ranging measurement; and adjusting the trajectory of the second wellbore at least in part based on the distance.

Drilling the second wellbore so as to have a varied distance to the first wellbore along at least a portion of the length of the second wellbore based on the measured temperature.

Generating a magnetic field from the first wellbore; measuring the magnetic field at the second wellbore; based on the measured magnetic field, identifying an azimuth angle between the wellbores, the range comprising a lateral component and a vertical component; adjusting the second wellbore drilling trajectory path laterally based upon the magnetic measurement; and adjusting the second wellbore drilling trajectory path vertically based upon the temperature measurement.

Adjusting the trajectory of the second wellbore so as to have a first distance from the first wellbore at a first location and a second distance from the first wellbore at a second location spaced apart from the first location, where the first distance is different than the second distance.

Optimizing the placement of the second wellbore relative to the first wellbore based on the thermal characteristic.

Utilizing the heat source in the first wellbore to establish a thermal envelope around the first wellbore; deploying a heat source within the second wellbore; utilizing the heat source in the second wellbore to establish a thermal envelope around the second wellbore so as to overlap the thermal envelope of the first wellbore.

Deploying a heat source comprises injecting steam in each of the first and second wellbores and establishing steam envelopes around each of the first and second wellbores.

Drilling a first wellbore; injecting steam into the first wellbore; following the injection of steam in the first wellbore, drilling a second wellbore.

Establishing a steam envelope around the first wellbore; injecting steam into the second wellbore; and establishing a steam envelope around the second wellbore so as to overlap the steam envelope of the first wellbore.

Identifying a range between the wellbores, the range comprising a lateral component and a vertical component; adjusting the second wellbore drilling trajectory path laterally based upon the magnetic measurement; and adjusting the second wellbore drilling trajectory path vertically based upon the temperature measurement.

Injecting steam into the second wellbore; and recovering hydrocarbons from the first wellbore.

Conducting advance recovery operations selected from the group consisting of SAGD, TAGD, THAI, VAPEX and fire flooding.

Altering the spacing between the first and second wellbores based on the temperature.

Adjusting the trajectory of the second wellbore so as to have a first distance from the first wellbore at a first location and a second distance from the first wellbore at a second location spaced apart from the first location, where the first distance is different than the second distance.

Each location is selected to be proximate to a thermal hotspot in the formation.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

What is claimed:

1. A method for drilling a wellbore comprising:
drilling a first wellbore in a formation;
deploying a thermal source within the first wellbore; and
drilling a second wellbore by adjusting a drilling trajectory of the second wellbore based on the thermal source.

2. The method of claim 1, wherein adjusting the drilling trajectory of the second wellbore comprises measuring a temperature in the second wellbore and utilizing the temperature to adjust a distance between the first and second wellbores so that the second wellbore at a select location along a length of the second wellbore is within a desired temperature range.

3. The method of claim 1, further comprising:
making an electromagnetic ranging measurement;
determining an azimuth angle to target from the electromagnetic ranging measurement; and adjusting the drilling trajectory of the second wellbore so that the second wellbore at a select location along a length of the second wellbore is within a desired azimuthal range.

4. The method of claim 1, further comprising:
determining a distance from an electromagnetic ranging measurement; and
adjusting the drilling trajectory of the second wellbore at least in part based on the distance.

5. The method of any one of claims 1 to 4, wherein deploying a thermal source comprises injecting steam in the first wellbore.

6. The method of any one of claims 1 to 4, further comprising establishing steam envelopes around each of the first and second wellbores.

7. The method of claim 4, further comprising drilling the second wellbore so as to have a varied distance to the first wellbore along at least a portion of a length of the second wellbore based on a measured temperature.

8. The method of claim 4, further comprising optimizing a placement of the second wellbore relative to the first wellbore based on a thermal characteristic.

9. The method of any one of claims 1 to 4, further comprising:
generating a magnetic field from the first wellbore;
measuring the magnetic field at the second wellbore;
based on the measured magnetic field, identifying an azimuth angle between the first and second wellbores, a range to the first wellbore comprising a lateral component and a vertical component;
adjusting the second wellbore drilling trajectory path laterally based upon the magnetic measurement; and
adjusting the second wellbore drilling trajectory path vertically based upon the temperature measurement.

10. The method of claim 4, further comprising altering a spacing between the first and second wellbores based on a temperature.

11. The method of claim 10, further comprising:
adjusting the trajectory of the second wellbore so as to have a first distance from the first wellbore at a first location and a second distance from the first wellbore at a second location spaced apart from the first location, where the first distance is different than the second distance.

12. A wellbore placement method comprising:
determining a magnetic characteristic between a first wellbore and a second wellbore;
determining a thermal characteristic between the first and second wellbores;
utilizing the magnetic characteristic to determine an azimuth angle between the first and second wellbores; and
utilizing the thermal characteristic to select a distance between the first and second wellbores.

13. The method of claim 12, further comprising:
drilling a first wellbore;
deploying a thermal source in the first wellbore;
initiating drilling of the second wellbore;
generating a magnetic field from the first wellbore;
utilizing an electromagnetic (EM) sensor in the second wellbore to measure the magnetic field; and
utilizing a temperature sensor in the second wellbore to measure a temperature.

14. The method of claim 13, further comprising utilizing the measured temperature to estimate a formation temperature adjacent the second wellbore.

15. The method of claim 13, further comprising:
prior to the steps of utilizing, suspending drilling of the second wellbore;
based on the measured temperature, adjusting a trajectory of the second wellbore; and
following adjustment of the trajectory, continuing drilling of the second wellbore.

16. The method of any one of claims 1-4, 7-8, 10-15, further comprising conducting advance recovery operations selected from the group consisting of steam assisted gravity drainage (SAGD), thermal assisted gravity drainage (TAGD), toe to heal air injection (THAI), vaporized hydrocarbon solvent (VAPEX), and fire flooding.

17. A wellbore placement system comprising:
a first wellbore with an elongated conductive member disposed therein;
a heat delivery system in communication with the first wellbore;
a current injection system disposed to delivery current to the elongated conductive member;
a second wellbore;
an electromagnetic (EM) sensor disposed in the second wellbore;
a thermal sensor disposed in the second wellbore, wherein the thermal sensor detects a temperature in a formation through which the second wellbore is being extended, and wherein the temperature is elevated in response to heat delivered into the first wellbore by the heat delivery system; and
a steering module that steers a drill bit in the second wellbore in response to the thermal sensor detections.

18. The system of claim 17, wherein the heat delivery system comprises a source of steam.

19. The system of claim 17, wherein the thermal sensor is a contact sensor.

20. The system of claim 19, wherein the thermal sensor is carried on a distal end of an extendable mechanism.

21. The system of claim 17, further comprising an elongated housing disposed in the second wellbore and at least two thermal sensors spaced apart along the housing.

22. The system of claim 17, further comprising at least two magnetometers disposed in the second wellbore.

23. The system of claim 17 further comprising an elongated housing disposed in the second wellbore and at least four thermal sensors uniformly spaced from one another about a perimeter of the housing.

24. The system of claim 17, further comprising a first array of thermal sensors, the first array comprising at least two thermal sensors uniformly spaced from one another about a perimeter of an elongated housing.

25. The system of claim 24, further comprising a second array of thermal sensors, the second array comprising at least two thermal sensors uniformly spaced from one another about a perimeter of the housing and axially spaced apart from the first array.

26. The system of claim 17, wherein the EM sensor and thermal sensor are carried on a conveyance vehicle selected from the group consisting of wireline, slickline, coiled tubing or drill string.

* * * * *